Jan. 15, 1935.  F. GLASSFORD  1,987,677
MEANS FOR ASSEMBLING HARD METAL INSERTS IN INTERNAL COMBUSTION ENGINES
Filed Jan. 17, 1933    2 Sheets-Sheet 1
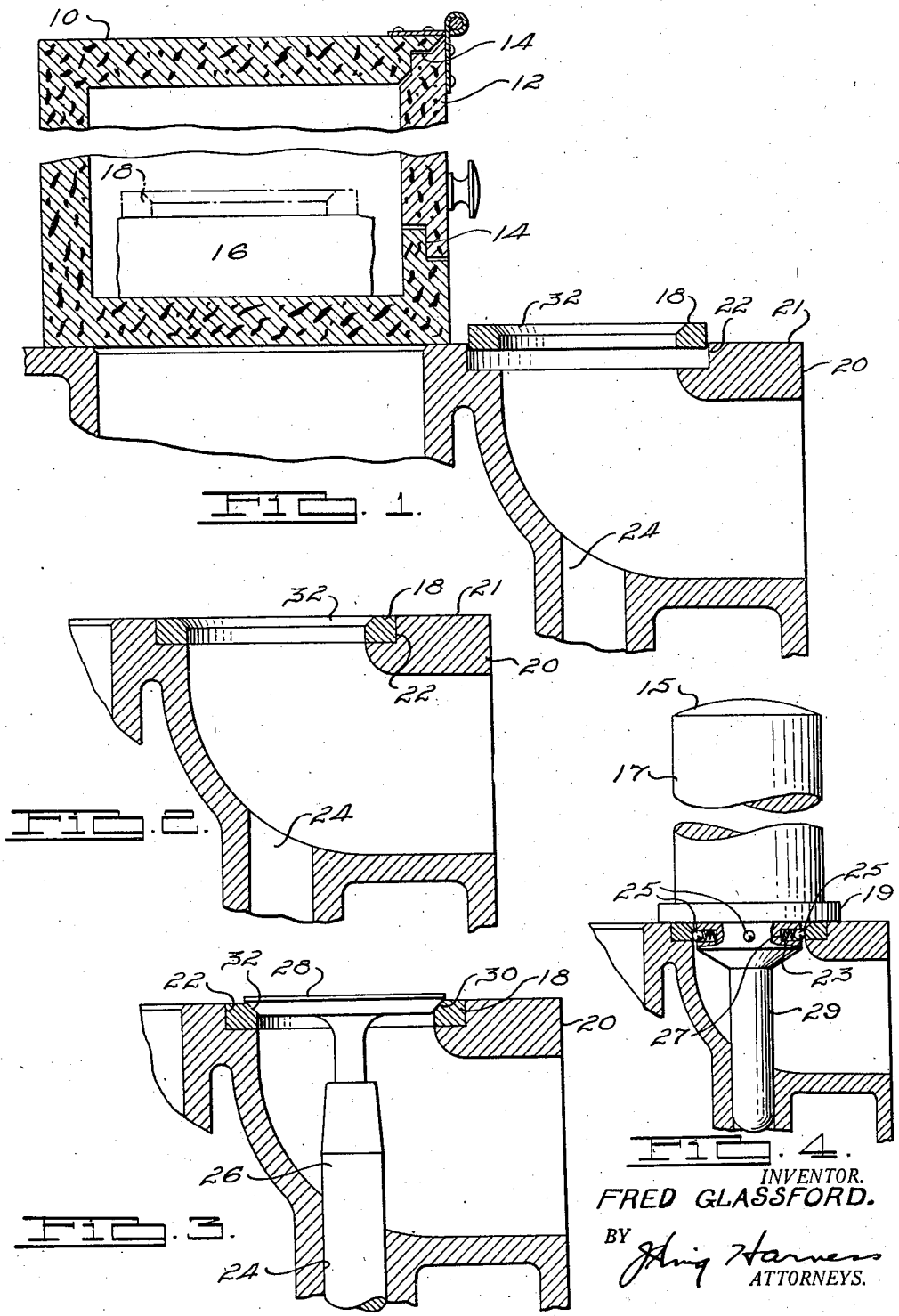
INVENTOR.
FRED GLASSFORD.
BY
ATTORNEYS.

Jan. 15, 1935. F. GLASSFORD 1,987,677
MEANS FOR ASSEMBLING HARD METAL INSERTS IN INTERNAL COMBUSTION ENGINES
Filed Jan. 17, 1933 2 Sheets-Sheet 2
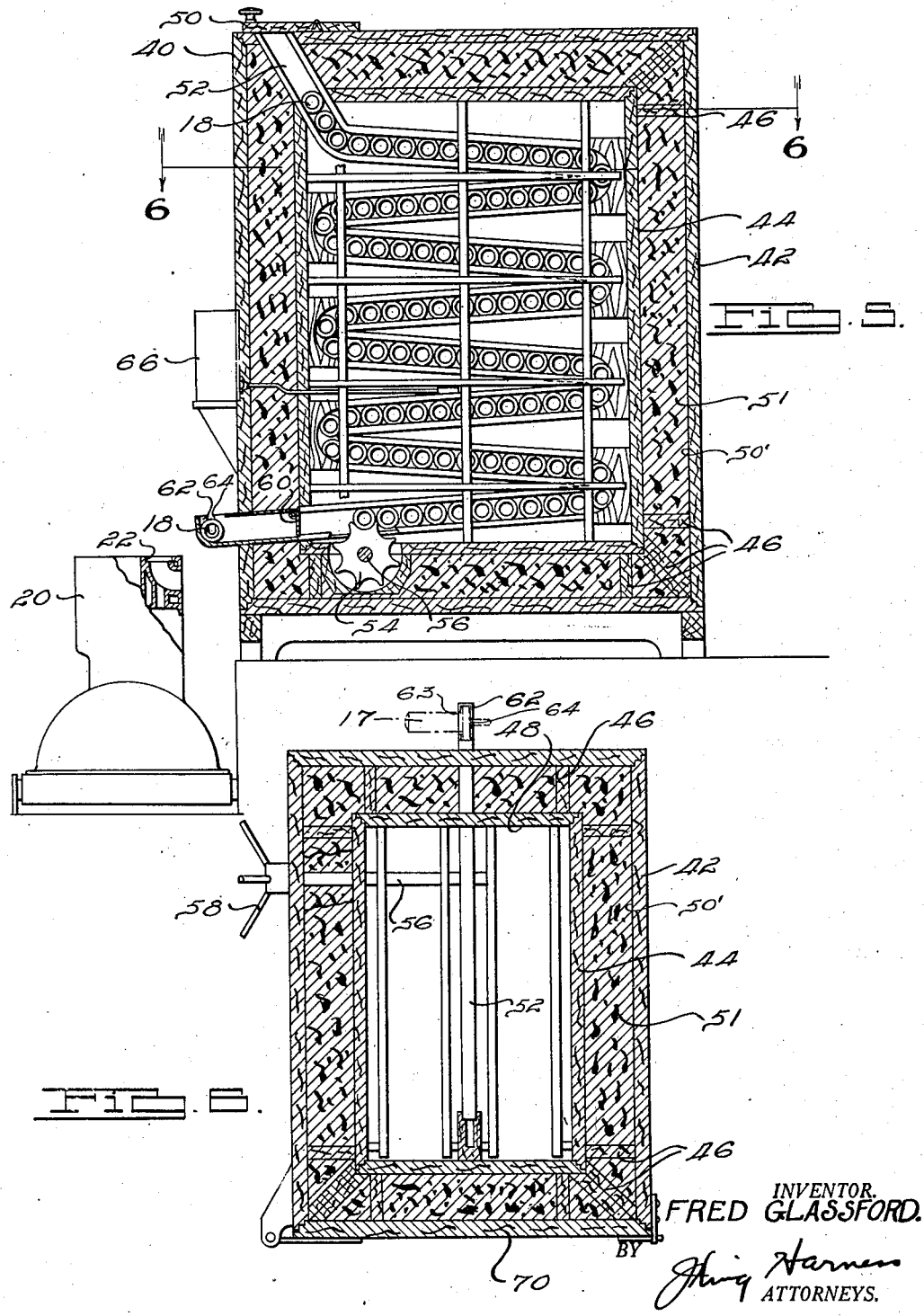
INVENTOR.
FRED GLASSFORD.
BY
ATTORNEYS.

Patented Jan. 15, 1935

1,987,677

UNITED STATES PATENT OFFICE 1,987,677

MEANS FOR ASSEMBLING HARD METAL INSERTS IN INTERNAL COMBUSTION ENGINES

Fred Glassford, Royal Oak, Mich., assignor to Chrysler Corporation, Detroit, Mich., a corporation of Delaware Application January 17, 1933, Serial No. 652,190

3 Claims. (Cl. 29—88.2)

The present invention relates to internal combustion engines and more especially to mechanism for and a method of assembling and securing hard metal inserts into recesses provided therefor in parts of such engine.

In the art of internal combustion engines, it is very desirable to provide certain portions thereof with hard metal inserts with high resistance to heat and corrosion, such as, for example, the seat of the exhaust valve of the engine. In the case of the exhaust valve, the exhaust gases, due to their high temperatures and velocities, normally tend to pit and/or score both the valve and valve seat. The provision of a valve of proper material to withstand the pitting and/or scoring action offers little difficulty as the valves may be pre-formed and readily assembled in the cylinder block. The provision of a satisfactory valve seat, however, offers more difficulty. The material of the cylinder block is not and cannot be made of sufficient hardness to resist pitting and/or scoring. Heat treatment of the valve seat portion may increase, to some extent, the hardness of the seat portion but the desired degree of hardness cannot thus be attained. Heat treatments of portions of the block also tend to distort the block and induce undesirable internal strain therein.

Various expedients have been employed to secure a pre-formed insert member in assembled relation with respect to engine parts. These expedients have not, however, always been successful in retaining the insert securely in place and do not provide for the proper alignment of the insert relative to the engine parts so that the insert member and cooperating element may be fitted or "ground in" with the minimum removal of metal from such insert and element after they are in assembled position. It is an object of this invention to obviate the above difficulties.

A further object of the invention is to be provide a novel method of fixing hard metal inserts securely in an engine part.

Another object is to assemble a hard metal insert in the desired alignment relative to an engine part.

Another object is to provide a method of assembling a valve seat insert exactly at right angles to a valve stem guide formed in a cylinder block.

Another object is to provide a hard valve seat, highly resistant to heat and corrosion, without setting up internal strain within a cylinder block or otherwise materially weakening the same.

Other objects and advantages will become apparent from the following description and appended claims, taken in connection with the accompanying drawings which illustrate mechanisms by which the method in accordance with the principles of this invention may be effected.

In the drawings:

Figure 1 is a sectional view of portions of a cooling chamber and of a cylinder block as arranged to effect the assembly of a valve seat insert in such cylinder block.

Figs. 2 and 3 are similar views illustrating, respectively, a valve seat insert and cylinder block, and a valve, valve guide, valve seat insert, and cylinder block in assembled relation, Fig. 4 is a view similar to Figs. 2 and 3 showing a device for handling, guiding and pressing a valve seat insert into place in a cylinder block.

Fig. 5 is a central vertical section of another form of cooling and dispensing unit, illustrating the relative position of such unit and a cylinder block during an assembling operation, and Fig. 6 is a section on line 6—6 of Fig. 5, certain parts being omitted in order to illustrate more clearly other parts.

Referring more particularly to Figs. 1 to 4, inclusive, one method of effecting the assembly of a valve seat insert in a cylinder block will be described. In making this assembly a refrigerating chamber, in the form of a box, is more or less diagrammatically illustrated at 10. In practice, the box is made of any suitable insulating material having walls which provide insulation equivalent to that afforded by a six inch wall thickness of cork. The box 10 is provided with a door 12 which is stepped at the margins thereof as indicated at 14. The door 12 opens from the side of the box to provide for the insertion of a refrigerant 16 preferably in the form of solid carbon dioxide and for the insertion and removal of valve seat inserts 18 from the box. In the construction of box 10 care is taken to avoid any continuous metallic surfaces extending from the refrigeration chamber to the outside of the box. The box preferably has a capacity of 8 to 12 valve seat inserts and the solid carbon dioxide employed as a refrigerant. The desired number of inserts 18 and a suitable amount of refrigerant 16 are disposed in the cooling chamber of box 10 which is kept closed until the inserts have been cooled to a temperature of from 50° to 70° F. below 0° F. By cooling to this temperature the inserts may be reduced in diameter from .003 to .005 of an inch. Due to the inherent lightness of most heat insulating materials, and due to the fact that the load within the box 10 will not exceed three or four pounds, the loaded cooling box 10 will be portable and hence may be disposed adjacent a recess 22 provided in the cylinder block. The recess 22 has approximately the same dimensions as the insert 18 when both the insert and block are in room temperature. The inserts 18 may be manually or otherwise removed from the box 10 one at a time and are immediately aligned with the recesses 22 and pressed into place. A considerable amount of force is required to press the insert into place within the recess 22 even though the diameter of the insert has been reduced by the amount above specified. With the ring in place in the cylinder, there is an immediate transfer of heat from the cylinder block to the insert which causes the insert to expand and become very solidly secured to the block by frictional engagement affording much greater holding capacity between the insert and the block than that afforded by interconnections made by previously employed methods.

Referring particularly to Fig. 3, it will be noted that the recess 22 is cut into the block 20 in a direction normal to the top surface 21 of the cylinder block. Recess 22 may be cut to a predetermined depth so that the base of the recess and the upper surface 21 of the block may both serve as guides in securing the desired alignment of the insert 18 with respect to the cylinder block when effecting the assembly. An opening 24 is provided in alignment with the axis of recess 22 and normal to the upper surface 21 of the cylinder block, and a valve guide 26 is disposed in the opening 24. Thus a valve 28 provided with a valve seat 30 may be inserted in guide 26 with the assurance that the seating surface 30 will contact at all points with a valve seat 32 formed in insert 18 prior to its assembly with the cylinder block. Thus, little or not grinding of the valve and valve seat will be required after the valve has been placed in position. Valve seat inserts 18 are composed of a hard steel or steel alloy which will ordinarily last the life of the motor without requiring recutting or regrinding.

It is obvious that the above method of assembling a valve seat insert with respect to a cylinder block could be employed in assembling such wear parts as the valve guide 26 with respect to the block or a wear sleeve within the cylinder opening in the block. It is also noted that the above method of securing a valve seat insert could be employed in assembling a valve seat insert in the head of a valve-in-head type of internal combustion engines.

Referring more particularly to Fig. 4, means is shown for handling, guiding and pressing into place the cold valve seat inserts 18. This means may be in the form of a tool designated 15 comprising a relatively stocky body portion 17 and provided with a shoulder portion 19 of somewhat greater diameter than the outside diameter of an insert so that shoulder portion 19 can make contact with the top surface 21 of the cylinder block 20 over a considerable area. A second shoulder portion 23 of cylindrical form and having a diameter somewhat less than the inside diameter of an insert 18 is provided on the lower face of shoulder portion 19, as viewed in Fig. 4. This portion 23 is disposed approximately coaxially with respect to the axis of body portion 17 and shoulder portion 19. A plurality of outwardly biased balls 25 are arranged in the shoulder portion 23 so as to extend outwardly beyond the periphery of the shoulder portion 23 to clamp an insert 18 to the handling means 15 concentrically with respect to shoulder portion 23. The balls may be biased outwardly by springs 27 which are arranged to exert equal forces on the balls. A stem 29 projects downwardly from the lower face of shoulder portion 23, as viewed in Fig. 4, and is arranged coaxially with such shoulder portion and therefore perpendicular with the lower face of shoulder portion 19. The stem 29 is made of sufficient length to project into the valve guide opening 24 so that with this stem as a guide member, an insert 18 maintained in concentric relation with shoulder portion 23 and therefore in the same relation with respect to the stem 29, may be guided into proper position with respect to the recess 22, so as to be readily pressed therein.

In assembling the inserts 18 in the recesses 22, the inserts are disposed one at a time on the tool and maintained in position by the outwardly biased balls 25. The stem 29 of the tool is inserted in a valve guide opening 24 to such extent that the insert is brought to the upper margin of recess 22. The upper end of body portion 17 may then be pressed downwardly or struck a blow or blows to seat the insert 18 within the recess.

It will be noted that in the assembling of the insert, it is maintained perpendicular to the valve guide opening 24 by the lower face of shoulder portion 19, as viewed in Fig. 4, while the shoulder 19 is forced toward and into contact with the upper surface 21 of the cylinder block. Thus the assembled insert will be disposed perpendicular to the stem of valve 28 so that the valve seat 30 on the valve and seat 32 of the insert will make complete circumferential contact with little or no "grinding in" of the valve.

Referring particularly to Figs. 5 and 6, another type of cooling chamber is disclosed which may be employed in assembling valve inserts in the cylinder block of an internal combustion engine. This cooling chamber may take the form of a box 40 including an outer wall 42 and an inner wall 44, preferably composed of a soft wood with the grain disposed transversely to a direction from the inside to the outside of the box. The corners of the members making up the inside and outside walls are stepped to increase the effectiveness of the seal at these points. The inner and outer walls may be separated by spacer blocks 46 arranged with the grain thereof transverse to the direction from the inside to the outside of the box. The box is so designed as to carry no continuous metallic surfaces from the inside cooling cavity designated at 48 to the outside surface of the box. The space 50' between the inside and outside walls of the box are preferably filled with a suitable insulating material 51 so that the walls of the cooling chamber afford an insulation equivalent to a wall thickness of six inches of cork material. The box is made sufficiently large and to have a cooling capacity such that valve seat inserts may be delivered therefrom at a comparatively rapid rate, such as, for example, four inserts per minute. A suitable refrigerant such as solid carbon dioxide may be disposed within the cooling cavity 48. A door 50 is provided at the top of the box for the insertion of valve seat inserts, which are in the form of rings, into a channel or ring-way 52 which is continuous and slopes downwardly to the bottom of the cooling chamber so that the inserts or rings 18 may be caused to roll by gravity in a zig-zag path from the top to the bottom of the box. A dispensing device is provided at the bottom of the box and comprises a dispensing wheel 54 extending into the channel 52 and provided with a shaft 56 and operating handle 58. The delivery end 62 of channel 52 is open at the top and provided with a closed end and upwardly directed slots 63 and 64 extending to the open top so that the valve seat inserts 18 may be readily removed therefrom by means of the tool 15 and positioned within the recesses 22 in the cylinder block 20 in the manner previously explained. To this end the slot 63 is made of sufficient width to allow the shoulder portion 19 of tool 15 to pass freely therethrough while the slot 64 is made of a greater width than the diameter of stem 29 and of less width than the inside diameter of an insert. With this construction, the tool may be employed to pick up the inserts by passing the stem and shoulder portion 19 through slot 63 from left to right as viewed in Fig. 6 until the shoulder portion 19 abuts the insert and the latter is held on shoulder portion 23 by the spring pressed balls 25. The tool may then be removed from the delivery end 62 of the dispensing device by moving the same vertically with the insert positioned on the tool so as to be readily pressed into recess 22 in the cylinder block as previously described. The entrance and exit ends of channel 52 and shaft 56 are made of heat insulating material so that the cooling chamber of the box will not receive heat from the outside through these elements. A swingable gravity operated door 60 may be provided at the exit end of channel 52. A temperature responsive unit 66 may be provided to indicate the temperature of the cooling cavity 48, which should be kept from 50° to 70° below zero F. when delivering inserts. The box is provided with a door 70 so that solid carbon dioxide blocks may be loaded into the cooling cavity 48 from the side of the box. This door is also stepped at the margins so as to increase the seal between the door and the cooperating parts of the wall members of the box.

As many changes could be made in the above method and apparatus and many apparently widely different methods and apparatus could be employed in carrying out this invention without departing from the scope thereof, it is intended that all matter contained in the above description or shown in the accompanying drawings shall be interpreted as illustrative and not in a limiting sense.

What is claimed is:

1. A tool for handling, guiding and pressing a valve seat insert into a recess provided therefor in a cylinder block, said tool comprising a handle portion, an enlarged annular shoulder portion at one end of said handle portion and axially arranged thereon, a reduced cylindrical portion beyond said shoulder portion with respect to said handle portion and axially arranged thereon, a plurality of spring pressed detents mounted in the periphery of said reduced cylindrical portion and movable radially outwardly thereon to engage the inner periphery of a valve seat insert to maintain the same in axially aligned position on said tool, and a guide stem portion extending axially from said reduced portion and adapted to cooperate with a valve guide opening in said block for aligning said tool relative to said recess, whereby said shoulder portion forces said insert into said recess upon movement of the tool toward said block.

2. A tool for handling, guiding and pressing a valve seat into a recess provided therefor in a cylinder block, said tool comprising a guide stem cooperable with a valve guide opening in said block for aligning said tool relative to said recess, axially arranged shoulders intermediate the ends of said tool, one of said shoulders being adapted to force the insert into the recess upon movement of the tool toward said block, and yieldable arcuately spaced elements mounted in the other of said shoulders engaging and maintaining said insert in a predetermined aligned position on said tool.

3. A tool for handling, guiding and pressing a valve seat into a recess provided therefor in a cylinder block, said tool comprising a guide stem cooperable with a valve guide opening in said block for aligning said tool relative to said recess, a shoulder on said tool having a diameter greater than the diameter of said recess for forcing said insert in the recess during operation of the tool, and a second shoulder axially spaced from said first named shoulder having a diameter less than the diameter of said recess and adapted to be disposed internally of the cylinder block, said last named shoulder having a plurality of yieldably radially pressed elements engaging and maintaining said insert in axial alignment on the tool.

FRED GLASSFORD.